United States Patent
Wilhelm (10) Patent No.: US 10,171,535 B2
(45) Date of Patent: *Jan. 1, 2019

(54) CONTROLLING MP3 PLAYER

(71) Applicant: International Business Machines Corporation, Armonk, NY (US)

(72) Inventor: Robert D. Wilhelm, Cheyenne, WY (US)

(73) Assignee: International Business Machines Corporation, Armonk, NY (US)

( * ) Notice: Subject to any disclaimer, the term of this patent is extended or adjusted under 35 U.S.C. 154(b) by 413 days.

This patent is subject to a terminal disclaimer.

(21) Appl. No.: 15/002,756

(22) Filed: Jan. 21, 2016

(65) Prior Publication Data
US 2016/0142459 A1 May 19, 2016

Related U.S. Application Data

(63) Continuation of application No. 11/690,976, filed on Mar. 26, 2007, now Pat. No. 9,258,346.

(51) Int. Cl.
*G06F 17/00* (2006.01)
*H04L 29/06* (2006.01)
(Continued)

(52) U.S. Cl.
CPC ............ *H04L 65/601* (2013.01); *H04L 67/06* (2013.01); *H04N 7/163* (2013.01);
(Continued)

(58) Field of Classification Search
CPC ....... H04L 65/601; H04L 67/06; H04N 7/163; H04N 21/234336; H04N 21/42684;
(Continued)

(56) References Cited

U.S. PATENT DOCUMENTS 6,944,287 B2  9/2005  Mori
9,258,346 B2  2/2016  Wilhelm
(Continued)

FOREIGN PATENT DOCUMENTS

CN   1805483   7/2006
EP   1318685   6/2003
(Continued)

OTHER PUBLICATIONS

Office Action (dated Jul. 12, 2011) for U.S. Appl. No. 11/690,976, filed Mar. 26, 2007, Conf. No. 4891.
(Continued)

*Primary Examiner* — Paul C McCord
(74) *Attorney, Agent, or Firm* — Schmeiser, Olsen & Watts, LLP; Michael Petrocelli (57) ABSTRACT

A computer system for implementing a method for communicating an audio message file from a computing device to an audio player device. The computer system includes the computing device, the audio player device, and one or more computer readable hardware storage devices containing program instructions which upon being executed on both the computing device and the audio player device, implement the method. An audio message file is generated by the computing device and sent to the audio player device. In response to receipt of the audio message file, the audio player device halts play of a song or other audio content that was being played by the audio player device at a time of receipt of the audio message file, and plays the audio message file.

8 Claims, 8 Drawing Sheets

(51) Int. Cl.
*H04N 7/16* (2011.01)
*H04N 21/2343* (2011.01)
*H04N 21/426* (2011.01)
*H04N 21/432* (2011.01)
*H04N 21/433* (2011.01)
*H04N 21/439* (2011.01)
*H04N 21/81* (2011.01)
*H04L 29/08* (2006.01)

(52) U.S. Cl.
CPC ........... *H04N 21/234336* (2013.01); *H04N 21/42684* (2013.01); *H04N 21/439* (2013.01); *H04N 21/4325* (2013.01); *H04N 21/4333* (2013.01); *H04N 21/8113* (2013.01)

(58) Field of Classification Search
CPC ........... H04N 21/4325; H04N 21/4333; H04N 21/439; H04N 21/8113
USPC .......................................................... 700/94
See application file for complete search history.

(56) References Cited

U.S. PATENT DOCUMENTS

| | | |
|---|---|---|
| 2005/0049002 A1 | 3/2005 | White et al. |
| 2005/0169443 A1 | 8/2005 | Rosenthal |
| 2006/0095525 A1 | 5/2006 | Mousseau et al. |
| 2007/0098351 A1 | 5/2007 | East et al. |
| 2008/0240373 A1 | 10/2008 | Wilhelm |

FOREIGN PATENT DOCUMENTS

| | | |
|---|---|---|
| TW | 1273505 | 2/2007 |
| WO | 0209088 | 1/2002 |

OTHER PUBLICATIONS

Amendment (dated Oct. 11, 2011) for U.S. Appl. No. 11/690,976, filed Mar. 26, 2007, Conf. No. 4891.
Final Office Action (dated Dec. 23, 2011) for U.S. Appl. No. 11/690,976, filed Mar. 26, 2007, Conf. No. 4891.
Notice of Appeal (dated Mar. 21, 2012) for U.S. Appl. No. 11/690,976, filed Mar. 26, 2007, Conf. No. 4891.
Appeal Brief (May 1, 2012) for U.S. Appl. No. 11/690,976, filed Mar. 26, 2007, Conf. No. 4891.
Examiner's Answer (dated May 25, 2012) for U.S. Appl. No. 11/690,976, filed Mar. 26, 2007, Conf. No. 4891.
Reply Brief (Jun. 29, 2012) for U.S. Appl. No. 11/690,976, filed Mar. 26, 2007, Conf. No. 4891.
RCE (Mar. 25, 2015) for U.S. Appl. No. 11/690,976, filed Mar. 26, 2007, Conf. No. 4891.
Notice of Allowance (dated Oct. 16, 2015) for U.S. Appl. No. 11/690,976, filed Mar. 26, 2007, Conf. No. 4891.

CONTROLLING MP3 PLAYER

This application is a continuation application claiming priority to Ser. No. 11/690,976, filed Mar. 26, 2007, now U.S. Pat. No. 9,258,346, issued Feb. 9, 2016.

FIELD OF THE INVENTION

The invention relates generally to computer systems, and more specifically to control of MP3 or other audio players.

BACKGROUND OF THE INVENTION

Known MP3 players play audio, such as music. An MP3 player can load audio content such as a song from an external storage device such as a hard drive, CD/DVD or a memory stick. Alternately, an MP3 player can download the audio content from a server via a network. The MP3 player can either store the downloaded audio content in internal storage for subsequent fetching and playing or play it in real time as it is downloaded from the server, i.e. "streaming" mode. A WiFi enabled MP3 player can also download audio content via a wireless connection to a local WiFi port. The user can manually select each unit of audio content, for example, each song, for playing, or initiate playing of songs in a predetermined order.

Various forms of electronic communication are also well known today, such as e-mail and instant messaging.

An object of the present invention is to expand electronic communication.

SUMMARY OF THE INVENTION

The present invention resides in a system, method and program product for communicating an audio message to a listener of an audio player device. An audio message file is generated at a workstation and sent to the audio player device via a network. In response to receipt of the audio message file, the audio player device halts play of a song or other audio content that was being played by the audio player device at a time of receipt of the audio message file, and plays the audio message file.

The present invention also resides in another method for communicating an audio message to a listener of an audio player device. An audio message file is generated at a workstation and sent to the audio player device via a network. In response to receipt of the audio message file, the audio player device queues the audio message file for play after completion of play of a song or other audio content that was being played by the audio player device at a time of receipt of the audio message file. The audio player device plays the audio message file after completion of play of the song or other audio content that was being played by the audio player device at a time of receipt of the audio message file.

BRIEF DESCRIPTION OF THE FIGURES

FIGS. 5(A-C) form a flow chart which illustrate operation of the program within the MP3 player of FIG. 1 to process the audio message sent by the workstation of FIG. 1.

DETAILED DESCRIPTION OF THE PREFERRED EMBODIMENTS

Figure 1:
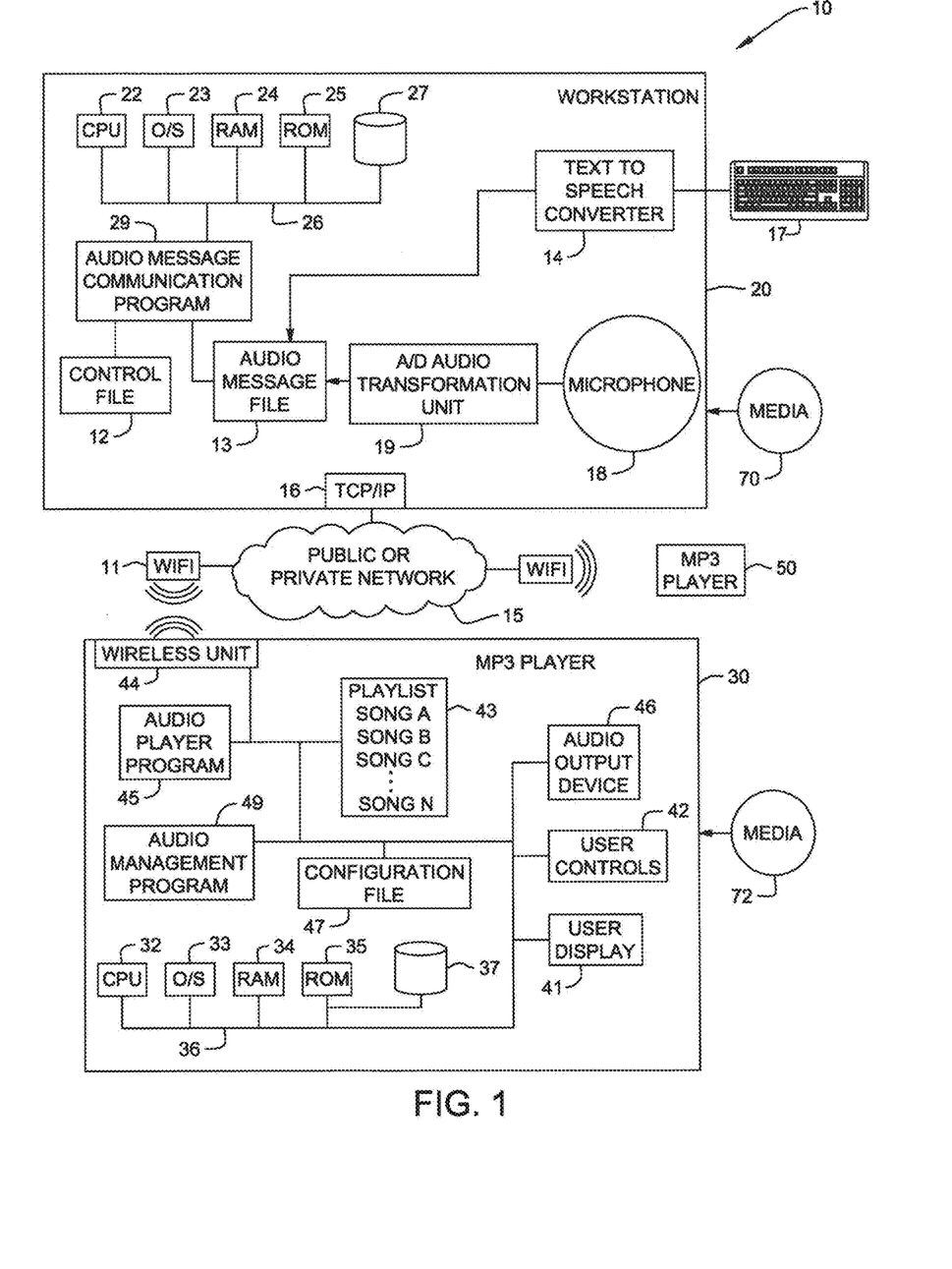
FIG. 1 is a block diagram of a distributed computer system including a workstation which sends an audio message and an MP3 player which receives and plays the audio message according to the present invention.

The present invention will now be described in detail with reference to the figures. FIG. 1 illustrates a distributed computer system generally designated 10 in which the present invention is implemented. Distributed system 10 includes a sending computer 20 such as a workstation (for example, a desk top computer, lap top computer, PDA, Blackberry device, cell phone, etc.) connected (by wire or wirelessly) to a network 15 such as the Internet. Computer 20 includes a known CPU 22, operating system 23, RAM 24 and ROM 25 on a common bus 26 and storage 27. Computer 20 also includes an audio message communication program 29 according to the present invention which enables a user to communicate an audio message to an MP3 player for playing.

Distributed system 10 also includes multiple MP3 players or other audio players such as MP3 players 30 and 50 connected (by wire or wirelessly) to a public or private network 15 (such as the Internet or an intranet). Typically, MP3 players 30 and 50 are wirelessly connected to a WiFi port 11 which is wired to the Internet 15 or a public or private network. MP3 player 30 includes a known CPU 32, operating system 33, RAM 34 and ROM 35 on a common bus 36 and storage 37. MP3 player 30 also includes an optional user display 41, user controls 42 such as a keypad, click wheel or touch pad, a play list 43 of songs or other audio content, a wireless interface unit 44, an audio player program 45 and an audio output device 46 (such as headphones or a speaker), and a port (typically USB) for connecting to a computer system in order to synchronize audio. The audio content such as songs A, B, C . . . N are stored in storage 37. State information such as an identity of a currently playing song and playtime elapsed of current song may be stored in RAM 34 or storage 37. The audio content can be downloaded to MP3 player 30 via wireless interface unit 44 in accordance with the prior art. Audio player program 45 plays the songs and other audio content in an order listed in play list 43, or as otherwise directed by audio player program 45. In accordance with the present invention, audio messages (and preliminary communications) are also communicated to MP3 player 30 via wireless interface unit 44. For example, sending computer 20 sends requests to send audio message files and the actual audio message files to MP3 player 30 via network 15 and wireless interface unit 44. MP3 player 30 sends responsive messages (including acceptance or rejection of the requests) to sending computer 20 via wireless interface unit 44 and network 15. MP3 player 30 also includes an audio message management program 49 according to the present invention which generates the responsive messages and controls processing of the audio message files which are accepted. MP3 player 50 and any other MP3 players in distributed system 10 contain similar software and hardware, and operate the same as MP3 player 30 when invoked according to the present invention.

The audio messages sent from workstation 20 to MP3 player 30 are functional communications typical of functional speech, for example, a reminder or request to attend a meeting, call someone, go somewhere such as a doctor's office or luncheon, or do something such as school homework or purchase an item at a store, etc. The audio message can also be a notification that something is ready such as a table for dinner at a restaurant, a take-out meal, custom-made product, etc.

Distributed system 10 operates as follows so that a user at workstation 20 can send an audio message file to MP3 player 30 for playing to a listener. The user at workstation 20 generates a message which is or will be transformed to an audio message. In the former case, the originator speaks the message into a microphone 18 in workstation 20, and the message is transformed to an audio message file 13 (in digital form) by an analog-to-digital audio transformation unit 19. In the latter case, the originator types a message at a keyboard 17 of workstation 20, and a known text to speech converter 14 converts the typed message into audio message file 13 (in digital form). Next, using program 29, the user identifies a target MP3 player (such as MP3 player 30) and sends a request to the target MP3 player to receive the audio message file. If the target MP3 player is turned-on and agrees to receive the audio message, then the workstation 20 sends the audio message file for playing by the MP3 player. A configuration file 47 within the MP3 player determines when the audio message will be played, (a) immediately in place of the currently playing audio content, if any, (b) immediately after the currently playing audio content completes its play or (c) at some other time specified in the configuration file. If the MP3 player is not turned-on, the workstation 20 will retry sending the request and audio message file later.

Figure 2A:
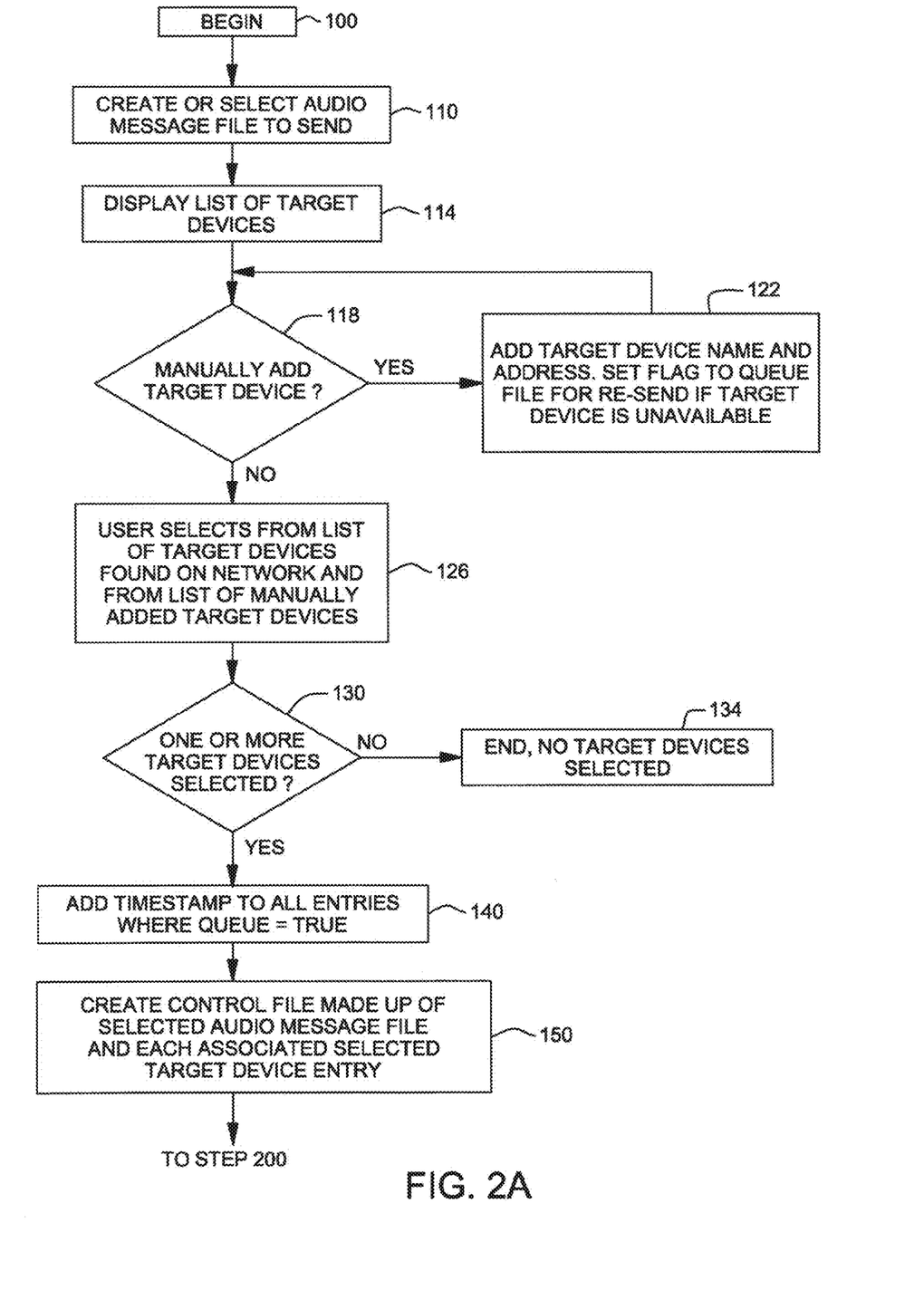
FIGS. 2(A) and 2(B) form a flowchart which illustrate initial operation of a program within the workstation of FIG. 1 to request to send an audio message to the MP3 player of FIG. 1.
Figure 2B:
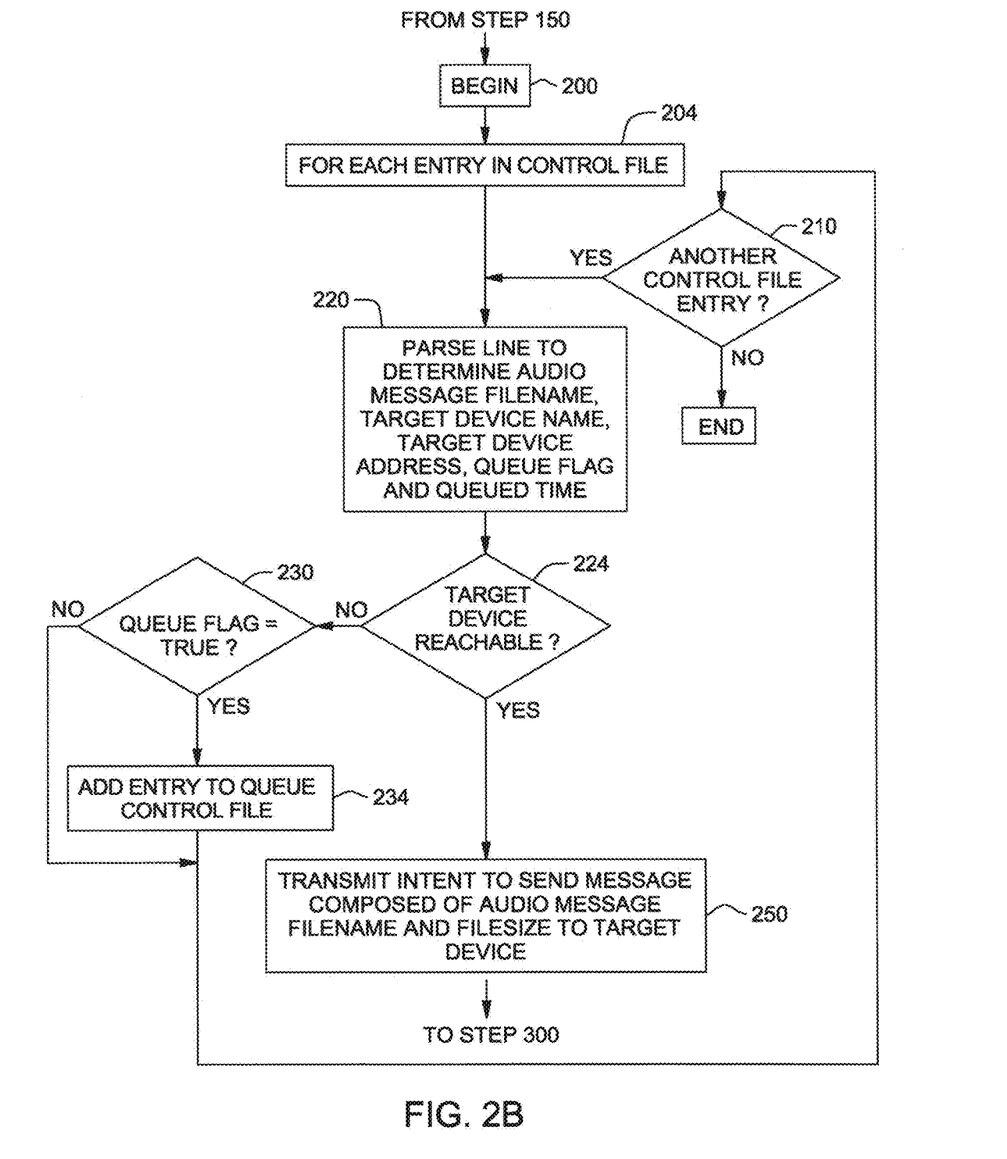

FIGS. 2(A) and 3(B) illustrate operation and function of audio message communication program 29 in more detail. In step 100, a user invokes program 29. In response, program 29 queries the user to create an audio message or select a preexisting audio message (step 110). In the former case, the user can speak the audio message into a microphone 18, and analog-to-digital audio transformation unit 19 converts the analog speech in a digitized audio message file 13. In the latter case, the user types the audio message using keyboard 17 of the workstation 20, and a text to speech converter 14 converts the text to digitized audio file 13. Next, program 29 displays a list of MP3 devices that a person has previously identified as potential targets to receive an audio message or are resident on the same subnet as workstation 20 (step 114). The intended target for the current message may or may not be on the preexisting list. If not, then the user will select an option to add the intended target to the list (decision 118, yes branch). In response, program 29 prompts the user to manually add the target device to the list by specifying an IP address of the target device along with a simple name (such as the owner) for the target device to appear in the list (step 122). Program 29 also sets a resend flag to queue the audio message file for resending if the target device is unavailable when sent the first time. After step 122 or if the target device was already on the list (decision 118, no branch), then program 29 prompts the user to select the target device from the list (step 126). If the user does not select a target device (decision 130, no branch), then that concludes execution of program 29 (step 134). However, if the user selects a target device (decision 130, yes branch), then program 29 adds a time stamp to the selection indicating the approximate time that a first attempt will be made to send the audio message to the target device (step 140). Next, program 29 creates a control file 12 comprising a name of the selected audio message file and the target MP3 device (step 150). The control file 12 also specifies the size of the audio message file and time stamp. Next, the user selects to send the audio message file(s) in the control file to the target device(s) specified in the control file (step 200). In response, for each entry in the control file (step 204), program 29 parses the entry to identify the audio message file name, MP3 target device name, queue flag and time stamp (step 220). Program repeats step 220 for each other entry in the control file (decision 210, yes branch). Next, program 29 attempts to "ping" the target device or otherwise attempt to establish a connection with the target device to determine if the target device is currently active (decision 224). If the target device is currently active (decision 224, yes branch), then program 29 establishes a connection with the target device and transmits to the target device a preliminary message indicating an intent to subsequently send the audio message. The intent-to-send preliminary message comprises the name of the audio message file and file size and also indicates in the header the source IP address of workstation 20 (step 250).

Referring again to decision 224, no branch, where the target MP3 device is not currently active or otherwise cannot be contacted (decision 224, no branch), then program 29 checks if the queue flag is true (decision 230). (The user set the queue flag to true in step 122 if the user wants to retry the intent-to-send preliminary message in the event the target device was not active when the first attempt was made to contact the target device.) If the queue flag is true (decision 230, yes branch), then program 29 adds the entry to the control file 12 for the purpose of resending the intent-to-send preliminary message later (step 234). However, if the queue flag is not true (decision 230, no branch), then program 29 does not add the entry to the control file, and will not resend the intent-to-send preliminary message. In either case, program 29 will continue at step 210 to determine if there is another entry in the control file to process. If another entry exists, program 29 will repeat at step 220 for the next entry listed.

Figure 3:
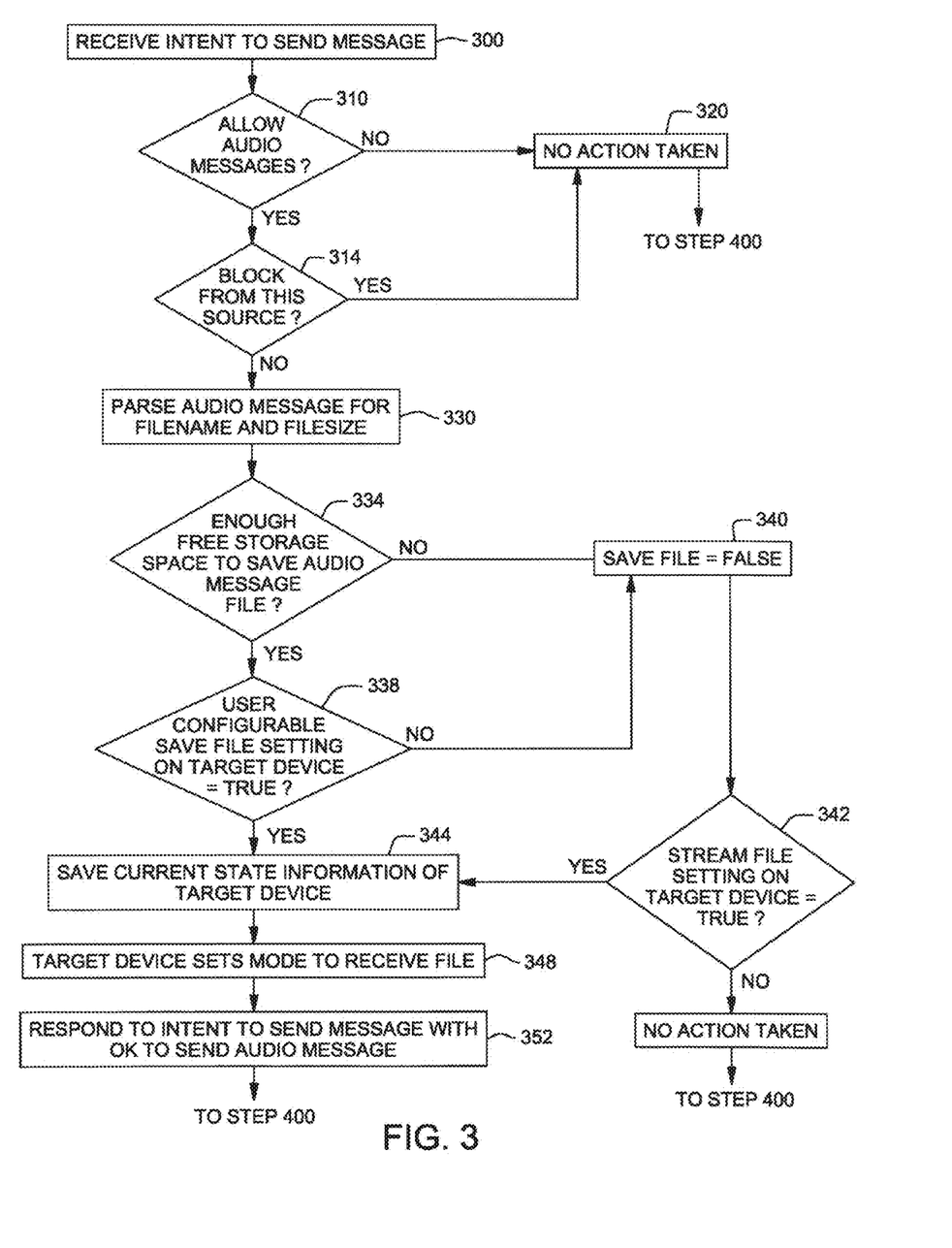
FIG. 3 is a flow chart which illustrates operation of a program within the MP3 player of FIG. 1 to process the request from the workstation of FIG. 1.

FIG. 3 illustrates operation and function of program 49 in response to receipt of the intent-to-send message from workstation 20 (step 300). Program 49 determines from a user-defined configuration file 47 whether audio messaging in device 30 is currently enabled (decision 310). If not, then no action is taken, i.e. the intent-to-send message from workstation 20 is ignored, and no responsive message is sent to workstation 20, so workstation 20 is not invited to send the actual audio message file to target device 30 (step 320). However, if audio messaging in device 30 is currently enabled (decision 310, yes branch), then program 49 determines whether to allow an audio message from the IP address of workstation 20 or a specific user based on the user-defined configuration file 47 in MP3 device 30 (decision 314). Configuration file 47 can indicate a list of user IDs or source IP addresses of source devices authorized to send audio messages, or conversely, a list of User IDs or source IP addresses of source devices which are not authorized, or that all devices on the same subnet as device 30 are authorized to send audio messages. If the intent-to-send message was not sent by an authorized workstation 20 or User ID or by a workstation or User ID which is explicitly blocked (decision 314, yes branch), then no action is taken, i.e. the intent-to-send message from workstation 20 is ignored (step 320). However, if workstation 20 or the user is authorized to send an audio message to device 30 (decision 314, no branch), then program 49 parses the intent-to-send message to identify the audio message file name and audio message file size (step 330). Next, program 49 determines by query to operating system 33 if device 30 has enough free storage to save the named audio message file (decision 334). If not (decision 334, no branch), then program 49 sets an error flag indicating that the named audio message file cannot be saved (step 340). Next, program 49 determines if configuration file 47 is set to stream any audio message from an authorized sender (decision 342). "Streaming" means to play the audio message promptly as the audio message is received (so it need not be stored). If the configuration file 47 is not set for streaming, then no action is taken with respect to the intent-to-send message (because there is room to store the audio message). However, if configuration file 47 is set for streaming (decision 342 yes branch), then program 49 saves the current state information of the device 30, i.e. (a) if a song or other audio content is currently being played, the current point in the song or other audio content which is played, or (b) if a song is not currently being played, the identity of the last song that was played (step 344). Next, program 49 sets the mode of device 30 to receive an audio message file from workstation 20 (step 348). Next, program 49 composes an "OK-to-send" audio message file and sends the OK-to-send responsive message to workstation 20 (step 352).

Refer again to step 334 yes branch, if the device determines that there is enough free storage to save the named audio message file, then program 49 determines from configuration file 47 whether the device has been configured to save the audio message. If the configuration file is set to not save (decision 338, no branch), then program 49 sets an error flag indicating that the named audio message file will not be saved (step 340). Next, program 49 determines if configuration file 47 is set to stream any audio message from an authorized sender (decision 342). "Streaming" means to play the audio message promptly as the audio message is received (so it need not be stored). If the configuration file 47 is not set for streaming, then no action is taken with respect to the intent-to-send message because the option to save the message is false and the option to stream the message is set to false. However, if configuration file 47 is set to save the file (decision 338, yes branch), then program 49 continues at step 344.

Figure 4:
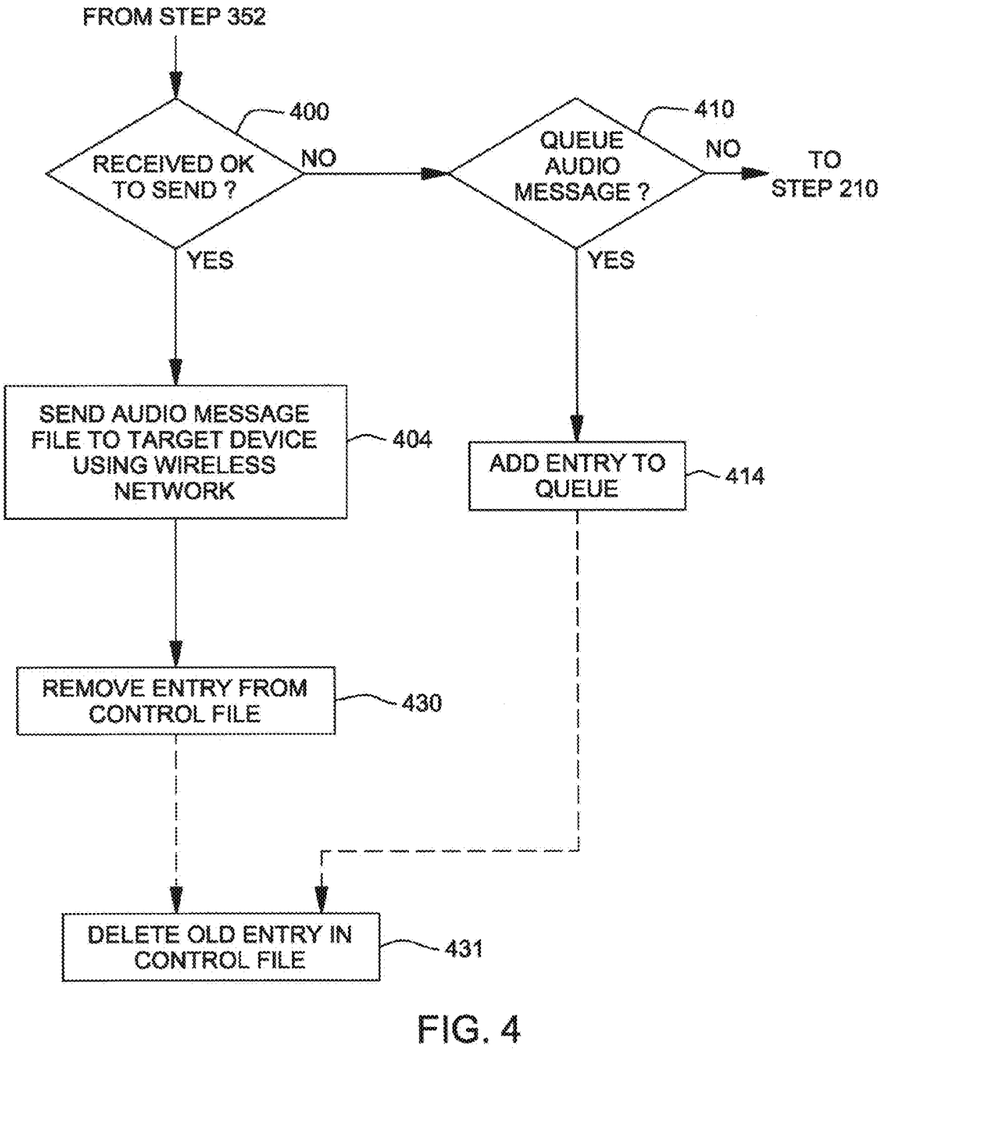
FIG. 4 is a flow chart which illustrates operation of the program within the workstation of FIG. 1 to send the audio message to the MP3 player of FIG. 1 if the program within the MP3 player allows the sending of the audio message.

FIG. 4 illustrates subsequent processing by program 29 in workstation 20. Program 29 in workstation 20 continually checks whether it has received an OK-to-send responsive message (decision 400) or whether the query has exceeded an allowable time to live (for example, an OK-to-send must be received within fifteen seconds of the query submission or the device is considered unavailable and program execution would continue with the checking for a next device in the control file at step 210). If an OK-to-send responsive message is received (decision 400, yes branch), then program 29 sends the audio message file to target MP3 device 30 via Internet or public/private network 15 and wireless unit 44 (step 404), and then removes the audio message entry from the control file (step 430). Referring again to decision 400, no branch, where an OK-to-send message has not been received because device 30 is not currently active, device 30 is active but program 29 declined to accept the audio message file in decision 310 or 314 or the intent-to-send message audio message file message has not yet been processed by device 30. In these cases, the time to live of the query expires and in such a case (decision 400, no branch), program 29 determines whether a queue flag was set in step 122 to queue the intent-to-send message for periodic resending. If so (decision 410, yes branch), then program 29 places another entry in the control file for this audio message (step 410) so another intent-to-send message will subsequently be sent to target device 30. Program 29 will resend the intent-to-send message periodically, such as every ten minutes. Also periodically, such as every four hours, program 29 checks the time stamps of the entries in its control file. For any entries that are older than a predetermined limit, such as two hours, program 29 deletes the entry from the control file (step 431). Program 29 will continue at step 210 to determine if there is another entry in the control file to process. If another entry exists, program 29 will repeat at step 220 for the next entry listed.

Figure 5A:
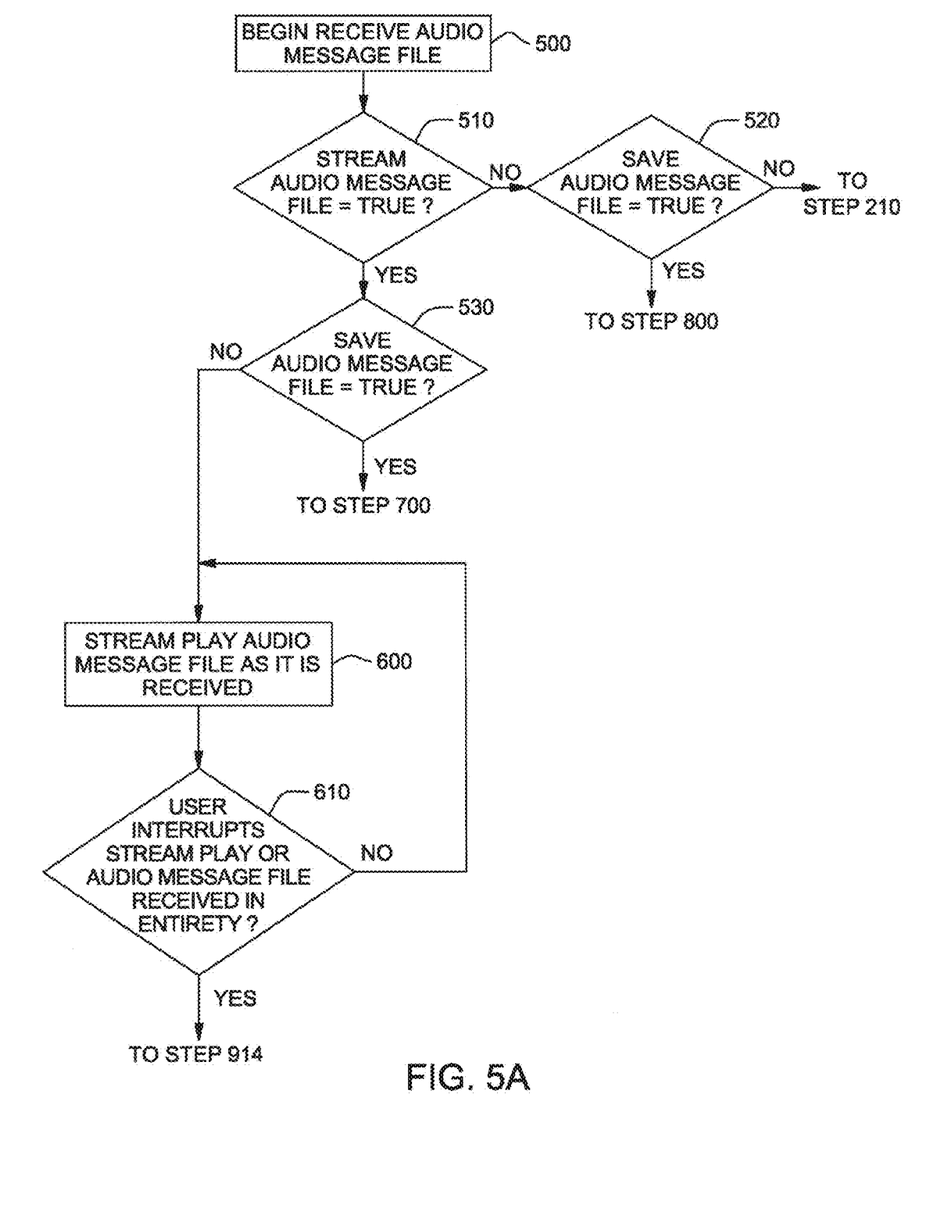
Figure 5B:
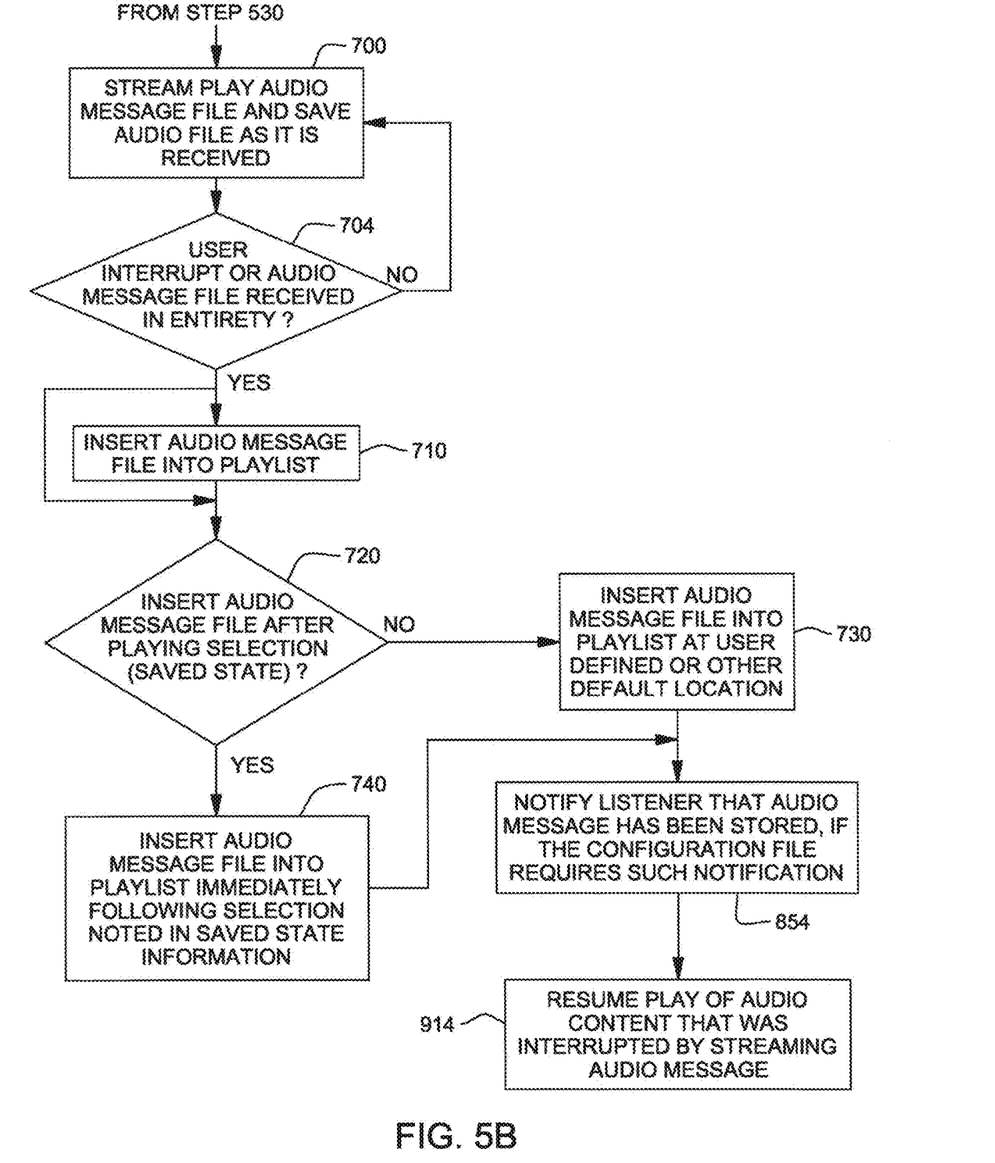
Figure 5C:
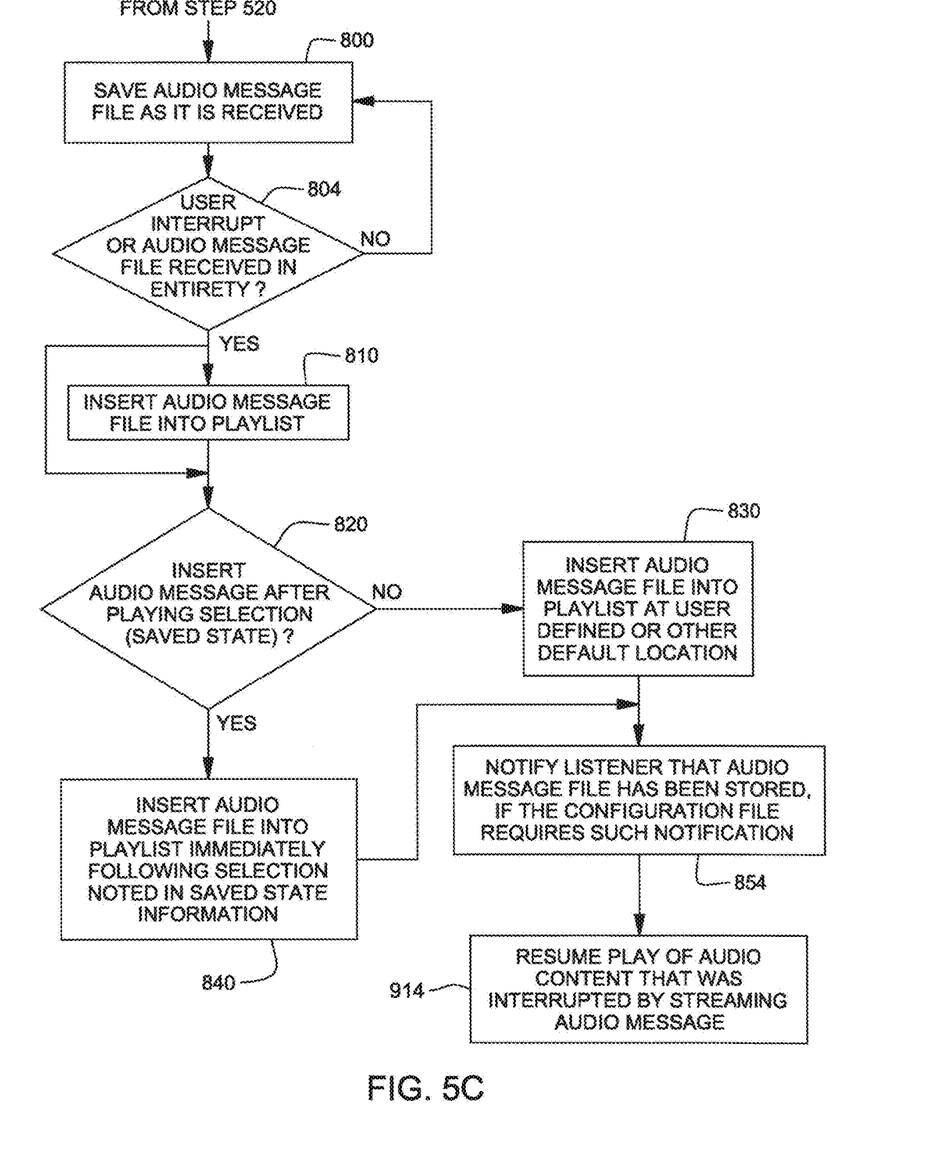

FIGS. 5(A-C) illustrate subsequent processing by program 49 at target MP3 device 30. In step 500, device 30 receives the audio message file from workstation 20. This is the case where device 30 previously sent the OK-to-send response to workstation 20. In response to the audio message file, program 49 checks configuration file 47 to determine if device 30 is configured to (promptly) stream the audio message file (decision 510). If not (decision 510, no branch), then program 49 determines if a file save flag in device 30 is set (decision 520). If not (decision 520, no branch), then program 49 ignores the audio message file. However, if the file save flag is set (decision 520, yes branch), then program 49 proceeds to step 800 and decision 804 to save the audio message file. Next, program 49 determines where to insert the audio message file into the play list based on user configuration file 47. If configuration file 47 states that an incoming audio message file should be played after the current song or other audio content is completed (decision 820, yes branch), then program 49 inserts the incoming audio message file in the play list 43 immediately after the song or other audio content that is currently being played (step 840) so that it will be played next. However, if configuration file 47 states that an incoming message should be played at some other time, for example, as the last entry in the play list, then program 49 will insert the incoming audio message file into the play list 43 accordingly (step 830). After step 840 or 830, program 49 notifies the listener (by a tone or other predetermined signal) that an audio message file has been added to the play list 43 and will eventually be played (step 854). Next, program 49 resumes play of the song or other audio content that was interrupted by the streaming audio message (after the listener halted the streaming audio message) (step 914).

Refer again to decision 510, yes branch where configuration file 47 is set for streaming mode. In such a case, program 49 determines if the flag is also set to save the audio message file (decision 530). (The audio message file may be needed from storage later if the listener at device 30 halts the playing of the audio message in streaming mode.) If the save file flag is not set (decision 530, no branch), then program 49 directs the immediate cessation of a currently playing audio song or other audio content, if any, and immediate streaming of the incoming audio message file (step 600 and decision 610). Next, program 49 continues processing at step 914 as described above.

Refer again to decision 530, yes branch wherein configuration file 47 is set to save the file (and stream an incoming audio message). In such a case, program 49 directs the immediate cessation of a currently playing audio song or other audio content, if any, and immediate streaming of the incoming audio message file (step 700). Concurrently, program 49 saves the incoming audio message file to storage (step 700). Next, program 49 determines where to insert the audio message file into the play list based on user configuration file 47. If configuration file 47 states that an incoming audio message file should be played after the current song or other audio content is completed (decision 720, yes branch), then program 49 inserts the incoming audio message file in the play list 43 immediately after the song or other audio content that is currently being played (step 740) so that it will be played next. However, if configuration file 47 states that an incoming message should be played at some other time, for example, as the last entry in the play list, then program 49 will insert the incoming audio message file into the play list 43 accordingly (step 730). After step 740 or 730, program 49 notifies the listener (by a tone or other predetermined signal) that an audio message file has been added to the play list 43 and will eventually be played (step 754). Next, program 49 resumes play of the song or other audio content that was interrupted by the streaming audio message (after the listener halted the streaming audio message) (step 914).

Program 29 can be loaded into workstation 20 from a computer readable media 70 such as magnetic tape or disk, optical media, DVD, semiconductor media, memory stick, etc. or downloaded from the Internet 15 via a TCP/IP adapter card 16.

Program 49 can be loaded into MP3 device 30 from a computer readable media 72 such as magnetic tape or disk, optical media, DVD, semiconductor media, memory stick, etc. or downloaded from the Internet 15 via a wireless unit 44.

What is claimed is:

1. A computer system, comprising a computing device, an audio player device, and one or more computer readable hardware storage devices containing program instructions which upon being executed on both the computing device and the audio player device, implement a method for communicating an audio message file from the computing device to the audio player device, said method comprising:
    said computing device generating or selecting the audio message file;
    said computing device creating a control file comprising a first entry, wherein the first entry comprises the identity of the audio player device, a name of the audio message file to be sent to the audio player device, a time stamp denoting a time at which to send the audio message file to the audio player device, and a queue flag having a value of TRUE if an attempt is to be made to send the audio message file to the audio player device later in response to a determination that the audio player device is not currently active;
    said computing device parsing the first entry in the control file;
    said computing device identifying from said parsing the first entry: the audio player device, the name of the audio message file, the time stamp, and the queue flag;
    said computing device ascertaining whether the audio player device is currently active;
    if said ascertaining ascertains that the audio player device is currently active, then said computing device sending an intent-to-send preliminary message to the audio player device, wherein the intent-to-send preliminary message contains the name of the audio message file, a size of the audio message file, and an Internet Protocol (IP) address of the computing device;
    if said ascertaining ascertains that the audio player device is not currently active, then said computing device determining whether the queue flag has the value of TRUE, and in response to determining that the queue flag has the value of TRUE, said computing device adding the first entry to the control file as a next entry in the control file to process, parsing the first entry, and determining that the audio player device is currently active, and in response, said computing device sending the intent-to-send preliminary message to the audio player device;
    after said sending the intent-to-send preliminary message to the audio player device, said computing device receiving, from the audio player device, an OK-to-send message, and in response, said computing device sending the audio message file from the computing device to the audio player device at the time denoted by the time stamp and said computing device deleting the first entry in the control file;
    said audio player device receiving the audio message file sent from the computing device to the audio player device; and
    in response to said receiving the audio message file, said audio player device halting play of a song or other audio content that was being played by the audio player device at a time of receipt of the audio message file and playing the audio message file approximately upon said halting play of the song or other audio content.

2. The computer system of claim 1, wherein said ascertaining ascertains that the audio player device is currently active.

3. The computer system of claim 1, wherein said ascertaining ascertains that the audio player device is not currently active.

4. The computer system of claim 1, said method further comprising:
    said audio player device receiving the intent-to-send preliminary message sent by the computing device;
    said audio player device determining that the IP address of the computing device in the intent-to-send preliminary message is not on a list of unauthorized IP addresses in a configuration file stored in the audio player device, and in response, said audio player device parsing the intent-to-send preliminary message;
    said audio player device identifying from said parsing the intent-to-send preliminary message: the name of the audio message file and the size of the audio message file;
    said audio player device deciding to either (i) save the audio message file having the name identified from said parsing of the intent-to-send preliminary message or (ii) stream the audio message file having the name identified from said parsing of the intent-to-send preliminary message;
    after said deciding, said audio player device sending the OK-to-send message to the computing device.

5. The computer system of claim 4, wherein said deciding comprises deciding to save the audio message file having the named identified from said parsing of the intent-to-send preliminary message which comprises:
    said audio player device determining, from the identified size of the audio message file, that the audio player device has enough free storage space to save the audio message file having the name identified from said parsing of the intent-to-send preliminary message; and
    said audio player device determining that the configuration file is set for saving the audio message file having the name identified from said parsing of the intent-to-send preliminary message.

6. The computer system of claim 4, wherein said deciding comprises deciding to stream the audio message file having the name identified from said parsing of the intent-to-send preliminary message.

7. The computer system of claim 6, wherein said deciding to stream the audio message file having the name identified from said parsing of the intent-to-send preliminary message comprises:
    said audio player device determining, from the identified size of the audio message file, that the audio player device has enough free storage space to save the audio message file having the name identified from said parsing of the intent-to-send preliminary message;
    said audio player device determining that the configuration file is not set for saving the audio message file, and in response, said audio player device setting an error flag indicating that the audio message file will not be saved; and
    said audio player device determining that the configuration file is set for streaming the audio message file.

8. The computer system of claim 6, wherein said deciding to stream the audio message file having the name identified from said parsing of the intent-to-send preliminary message comprises:
    said audio player device determining, from the identified size of the audio message file, that the audio player device does not have enough free storage space to save the audio message file having the name identified from said parsing of the intent-to-send preliminary message, and in response, said audio player device setting an error flag indicating that the audio message file will not be saved; and
    said audio player device determining that the configuration file is set for streaming the audio message file.

\* \* \* \* \*